United States Patent Office 3,440,241
Patented Apr. 22, 1969

3,440,241
PREPARATION OF 6-KETO-14α-HYDROXY-Δ⁷-DEHYDRO STEROIDS
John B. Siddall, Palo Alto, Calif., assignor to Syntex Corporation, Panama, Panama, a corporation of Panama
No Drawing. Filed May 31, 1966, Ser. No. 553,680
Int. Cl. C07c *167/00, 169/50, 173/00*
U.S. Cl. 260—239.57            7 Claims

ABSTRACT OF THE DISCLOSURE

Preparation of 6-keto-14α-hydroxy-Δ⁷-dehydro steroids by (1) irradiation of a 6-keto-Δ⁸⁽¹⁴⁾-dehydro steroid in the presence of oxygen followed by mild reduction or (2) epoxidation of a 6-keto-Δ⁸⁽¹⁴⁾-dehydro steroid followed by hydrolysis which are intermediates for the synthesis of the insect hormone ecdysone.

---

The present invention is directed at a novel chemical process. In particular, this invention relates to a process for the preparation of steroids bearing the 6-keto-14α-hydroxy-Δ⁷-dehydro system.

Various naturally occurring steroidal hormones, notably those found in members of the Insecta and Crustacea classes, have been shown to possess the 6-keto-14α-hydroxy-Δ⁷-dehydro system. The remarkable activity of these compounds and the extremely low level at which they occur naturally has prompted efforts at total chemical synthesis. Thus, the total synthesis of the insect hormone ecdysone has recently been reported (J.A.C.S., 88, 379 (1966), ibid. 862). The present invention is directed at a method for introducing the 6-keto-14α-hydroxy-Δ⁷-dehydro system in the synthesis of ecdysone, other related hormones such as crustecdysone, and chemical variations thereof.

Heretofore, the introduction of the 6-keto-14α-hydroxy-Δ⁷-dehydro system has involved treatment of a 6-keto-Δ⁷-dehydro system with selenium dioxide, generally at reflux for several hours. Formation of the requisite 6-keto-Δ⁷-dehydro starting material, accomplished through alpha-bromination of a 6-keto compound and subsequent dehydrobromination, required careful control to prevent excessive formation of the then-undesired 6-keto-Δ⁸⁽¹⁴⁾-dehydro isomer.

It has now been discovered that irradiation of the 6-keto-Δ⁸⁽¹⁴⁾-dehydro compounds in the presence of oxygen results in the formation of 6-keto-14α-hydroperoxy-Δ⁷-dehydro steroid and that this, upon mild reduction, is converted to the corresponding 6-keto-14α-hydroxy-Δ⁷-dehydro steroid.

This conversion may be represented as follows, showing only the pertinent positions of the steroid nucleus:

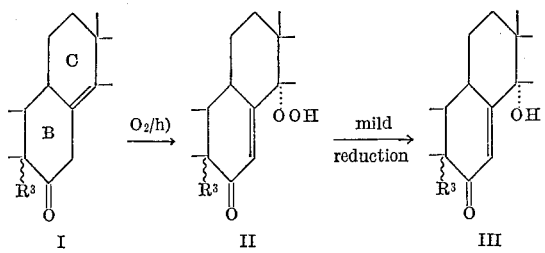

The irradition of the 6-keto-Δ⁸⁽¹⁴⁾-dehydro steroid (Formula I) may be effected at normal room temperatures with, for example, a conventional source of light such as sunlight or an ordinary electric light bulb. The effective wavelength appears to be in the range of from about 320 mμ to about 390 mμ, more particularly 330 mμ to 350 mμ. The reaction is conducted in the presence of an inert, nonaqueous, organic solvent. The nature of this solvent is not critical and it may thus be selected, on the basis of its solvent power for the particular steroid, out of a broad group of inert, nonaqueous, organic solvents such as aliphatic and alicyclic hydrocarbons, ethers, aromatic hydrocarbons, halogenated hydrocarbons, alcohols, and the like. The source of oxygen may be a stream of pure oxygen or of ordinary air which is bubbled through the reaction mixture.

The resultant 14α-hydroperoxy compound (Formula II) is then subjected to mild reductive conditions. Practically any mild reducing agent may be used, and the choice is limited only by the reactivity of other groups, e.g., the 6-keto group. Suitable agents include, for example, aluminum amalgam in aqueous tetrahydrofuran, sodium thiosulfate and potassium iodide in acetic acid, zinc and acetic acid, and the like. Stronger reducing agents such as the metal hydrides can also be used, but may require a subsequent step of back-oxidation, as for example to convert the thus-formed 6-hydroxy group to a 6-keto group. The reduction of the 14α-hydroperoxy group is extremely rapid and is generally complete in a matter of minutes or less, depending upon the reducing agent employed.

The 6-keto-Δ⁸⁽¹⁴⁾-dehydo starting material is obtained by alpha-bromination of a 6-keto compound such as by the action of bromine in acetic acid and hydrogen bromide. When the resultant 7-bromo compound is heated with lithium bromide or lithium carbonate for a brief period of time, such as at reflux in dimethylacetamide for 10 to 20 minutes, the 6-keto-Δ⁷-dehydro compound is obtained. By prolonging this reaction, such as refluxing for one or more hours, the 6-keto-Δ⁸⁽¹⁴⁾-dehydro compound is obtained.

As a result of the mild conditions involved in this process, it may be executed on a wide variety of steroidal starting materials. One typical class is that represented by the formula:

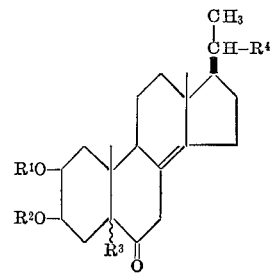

wherein each of R¹ and R² is hydrogen, acyl, or taken together an alkylidene group;

R³ is α-hydrogen, β-hydrogen, α-hydroxy or α-acyloxy; and

R⁴ is carbalkoxy, 5-oxotetrahydrofuran-2-yl, alkyl or a mono- or dihydroxyalkyl group.

The hydrocarbon carboxylic acyl and acyloxy groups of the compounds of the present invention contain less than 12 carbon atoms and may be of a straight, branched, cyclic or cyclic-aliphatic chain structure. This structure may be saturated, unsaturated or aromatic, and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The groups R¹ and R² are preferably lower alkanoyl, e.g., acetyl, or lower alkylidene, e.g., isopropylidene. R³ may be either α- or β-hydrogen or α-hydroxy, as well as the acylated derivatives thereof, preferably the alkanoates such as the acetate. R⁴ may be a carbalkoxy group, preferably a carbo(lower)alkoxy group such as carbomethoxy, carbethoxy and the like, or may be the 5-oxotetrahydrofuran-2-yl group, i.e., the lactone of γ-hydroxybutyric acid joined to the steroid moiety through the γ-carbon atom. R⁴ may also be an alkyl group or a mono- or dihydroxyalkyl group. Notable among this latter class are the groups of the formula

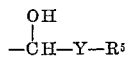

wherein R⁵ is hydroxy or hydrogen and Y is alkylene of 3 to 8 carbon atoms, e.g., 1-hydroxy-4-methylpent-1-yl, 1-hydroxy - 4,4 - dimethylpent - 1-yl and 1,4-dihydroxy-4-methylpent-1-yl.

As an alternative method of preparing the 14α-hydroxy compound of Formula III, the 6-keto-Δ-8(14)-dehydro intermediate (Formula I) may be treated with a conventional epoxidizing agent, such as m-chloroperbenzoic acid, to form the corresponding 6-keto-8α,14α-oxido intermediate. Upon treatment of this with either an acid or a base, the oxide ring is broken and the desired 6-keto-14α-hydroxy-Δ⁷ intermediate is obtained.

The following examples will serve to further typify the nature of this invention, but as these are presented solely for the purpose of illustration, they should not be construed as a limitation on the scope thereof.

Example 1

A mixture of 450 mg. of 7α-bromo-2β,3β-diacetoxy-5α-hydroxy - 6 - keto-22,23-bisnor-5α-cholanoic acid methyl ester, 12 ml. of dimethylacetamide and 400 mg. of lithium bromide is heated at reflux for one hour under nitrogen. The mixture is cooled and extracted with methylene chloride. These extracts are washed with water and saturated sodium chloride solution and concentrated in vacuo. The residue is chromatographed on silica gel to yield 2β,3β-diacetoxy - 5α-hydroxy-6-keto-22,23-bisnor-5α-chol-8(14)-enoic acid methyl ester. This material is dissolved in methylene chloride and irradiated with a 60-watt bulb for two hours while a stream of oxygen is bubbled through. At the end of this time, the mixture is concentrated in vacuo and the residue, without further purification, is dissolved in acetic acid. To this cooled mixture is added zinc dust. The mixture is stirred at this temperature for two minutes, filtered and diluted with methylene chloride. The organic solution is washed with water, dried and evaporated to yield 2β,3β - diacetoxy-5α,14α-dihydroxy-6-keto-22,23-bisnor-5α-chol-7-enoic acid methyl ester.

By subjected 2β,3β - diacetoxy-6-keto-7-bromo-22,23-bisnor-5α-cholanoic acid methyl ester to the foregoing procedure, there is obtained 2β,3β-diacetoxy-6-keto-14α-hydroxy - 22,23-bisnor-5α-chol-7-enoic acid methyl ester. Likewise, from the corresponding 5β-compound there is obtained 2β,3β - diacetoxy-6-keto-14α-hydroxy-22,23-bisnor-5β-chol-7-enoic acid methyl ester.

The requisite 7α-bromo starting material may be obtained as follows. A solution containing 3.8 g. of 2β,3β-diacetoxy-5α-hydroxy-6-keto-22,23-bisnor-5α-cholanoic acid methyl ester, 16 ml. of acetic acid, 2.4 ml. of 15% hydrogen bromide in acetic acid, and 9 ml. of an acetic acid solution of bromine (127 mg. of bromine:ml. of acetic acid), is stirred at room temperature for four hours, and excess bromine is then decomposed by the addition of sodium sulfite. Upon the addition of about 150 ml. of water, the solid which forms is collected by filtration and dried to yield 2β,3β - diacetoxy - 5α-hydroxy-6-keto-7α-bromo-22,23-bisnor-5α-cholanoic acid methyl ester, which may be recrystallized from methylene chloride and methanol.

Example 2

By subjecting 2β,3β,22,25-tetrahydroxy-6-keto-7-bromo-5β-cholestane to the procedure of Example 1, there is obtained 2β,3β,14α,22,25 - pentahydroxy-5β-cholest-7-en-6-one. The requisite starting material may be obtained from 2β,3β-diacetoxy-6-keto-cholanoic acid methyl ester via the procedure of oxidation to the aldehyde, treatment with Grignard reagent and catalytic hydrogenation as described by Kerb et al., Tetrahedron Letters, 13, 1387 (1966) for analogous compounds and α-bromination as described in Example 1.

Example 3

2β,3β,5α - triacetoxy-6-keto-7α-bromo-22,23-bisnor-5α-cholanoic acid methyl ester is dehydrobrominated as described in Example 1 to yield 2β,3β,5α-triacetoxy-6-keto-22,23-bisnor-5α-chol-8(14)-enoic acid methyl ester. This material is dissolved in absolute ethanol and irradiated with a 60-watt bulb while air is bubbled through the solution. After three hours, the solution is evaporated to dryness and the residue is dissolved in acetone and treated with 0.5 times its weight of Raney nickel for 10 minutes. The mixture is then filtered and evaporated to dryness to yield 2β,3β,5α - triacetoxy-6-keto-14α-hydroxy-22,23-bisnor-5α-chol-7-enoic acid methyl ester.

Example 4

To 660 mg. of sodium hydride paste which has been previously washed well with hexane and dried under nitrogen, are added under nitrogen 10 ml. of dimethylsulfoxide. The suspension is heated at 65° C. for 90 minutes, cooled to about 25° C., and 0.03 ml. of the reagent is added to a stirred solution of 3.6 mg. of 3β-hydroxy-22,23-bisnorchol-5-enoic acid methyl ester in 0.5 ml. of dry tetrahydrofuran and 0.3 ml. of dimethylsulfoxide, which is held under nitrogen. This mixture is stirred for 30 minutes at room temperature and then cautiously decomposed by the addition of water and extracted several times with methylene chloride. These extracts are washed with water and saturated sodium chloride solution, dried over sodium sulfate and evaporated to dryness to yield 3β-hydroxy-23-methylsulfinyl-24-norchol-5-en-22-one.

Fifteen grams of 3β-hydroxy-23-methylsulfinyl-24-norchol-5-en-22-one in 250 ml. of dimethylsulfoxide is treated with 8.45 g. of potassium t-butoxide. After five minutes, 6.4 ml. of methyl bromoacetate are then added over a 30-minute period. The mixture is stirred for one additional hour and then neutralized with acetic acid, diluted with water and extracted with methylene chloride. These extracts are dried and concentrated to yield 3β-hydroxy-22-keto-23-methylsulfinylchol-5-ene 24 - carboxylic acid methyl ester. This material is dissolved in 10% aqueous tetrahydrofuran and is treated over a 30-minute period with 9 g. of aluminum foil (which has been amalgamated by submerging in a 2% aqueous solution of mercuric chloride for 10 seconds and rinsed with ethanol and ether). After stirring for 10 minutes, the mixture is filtered, treated with 4.4 g. of sodium borohydride and stirred for four hours. At the end of this time, the excess reagent is decomposed by the addition of acetic acid and the mixture is concentrated. After dilution with water, the mixture is extracted several times with ethyl acetate. These extracts are dried and concentrated to dryness, and the solid thus obtained is dissolved in chloroform. The insoluble material is removed by filtration and the filtrate is concentrated to dryness. This residue is chromatographed on silica gel, eluting with 7:3 ethyl acetate:hexane to yield 3β,22-dihydroxychol-5-ene 24-carboxylic acid 22-lactone, which is further purified by recrystallization from methanol, M.P. 241–243° C.

This material is heated at steam bath temperature for one hour with 5 ml. of acetic anhydride and 10 ml. of pyridine. At the end of this time, the mixture is poured into water and this aqueous mixture is extracted with methylene chloride. These extracts are dried over sodium sulfate and evaporated to dryness to yield 3β-acetoxy-22-hydroxychol-5-ene 24-carboxylic acid 22-lactone.

Fifty grams of 3β-acetoxy-22-hydroxychol-5-ene 24- carboxylic acid 22-lactone are dissolved in 500 ml. of hot (88%) formic acid and held at about 70° C. for about 0.5 hour. Thereafter, the solution is cooled to about 20° C. and 60 ml. of (30%) hydrogen peroxide is added cautiously, and the resulting mixture is stirred for two hours, whereupon about 750 ml. of hot water is added. A gum is formed which is separated by decantation and filtration. The crude product is washed with water and dissolved in 800 ml. of hot methanol which contains a mixture of 38 g. of potassium hydroxide and 65 ml. of water. Saponification to the triol is complete after approximately two minutes. Neutralization of the solution with acetic acid followed by dilution with cold water results in the formation of a solid which is filtered and dried, affording 3β,5α,6β,22-tetrahydroxycholane 24-carboxylic acid 22-lactone. A solution containing 50 g. of this lactone in aqueous dioxane (50 ml. water, 450 ml. dioxane) is treated at about 20° C. with 29 g. of N-bromosuccinimide (1.25 mols). The oxidation is complete after about 1.5 hours, whereupon excess N-bromosuccinimide is decomposed by the addition of aqueous sodium sulfite until the solution is substantially colorless. The addition of about 1.2 liters of cold water to the solution results in the formation of a white solid. The mixture is cooled in ice, and the solid is collected by filtration and dried by suction to yield 3β,5α,22-trihydroxy-6-ketocholane 24-carboxylic acid 22-lactone. To a stirred solution of 38 g. of this steroid in 150 ml. of pyridine, cooled to 0° C., is added 50 g. of p-toluenesulfonyl chloride. The mixture is allowed to stand at about 20° C. for about 16 hours and is then diluted slowly by the addition of water while cooling in an ice bath, whereupon a solid precipitates. The thus-formed solid is separated, washed with water to remove pyridine and dried, thus yielding 3β-(p-toluenesulfonyloxy)-5α,22-dihydroxy-6-ketocholane 24-carboxylic acid 22-lactone, which may be further purified through recrystallization from methylene chloride:hexane. To a mixture of 18 g. of lithium carbonate and 210 ml. of dimethylacetamide at about 150° C. under nitrogen are added quickly 30 g. of the foregoing crystallized tosylate derivative. The mixture is maintained at a temperature of approximately 150° C. for 10 minutes and then cooled rapidly to about 0° C. The cooled mixture is added to cold water, yielding a solid which is collected by filtration, dried and extracted with benzene:water. These extracts are concentrated to give 5α,22-dihydroxy-6-ketochol-2-ene 24-carboxylic acid methyl ester, which is recrystallized from methylene chloride:hexane. To a stirred mixture containing 326 mg. of this steroid, 10 ml. of dry acetic acid and 260 mg. of iodine is added 167 mg. of dry silver acetate, portionwise, over a one-hour period. Stirring is continued for approximately six hours, whereupon the reaction mixture is taken up in methylene chloride, filtered, and washed with aqueous sodium thiosulfate and water. The methylene chloride is evaporated in vacuo at room temperature, and the residue therefrom is treated with excess silver nitrate and 10% aqueous methanol for approximately 10 minutes at about 70° C. The resulting reaction mixture is cooled, filtered, and the filtrate taken up in methylene chloride. This organic solution is washed with water and evaporated under vacuum. The thus-obtained crude product is chromatographed on silica gel, eluting with ethyl acetate:hexane mixtures. The desired 2β,3β,5α,22-tetrahydroxy-6-ketocholane 24-carboxylic acid 22-lactone is obtained by mild alkaline hydrolysis of the most polar of the products from the column. A mixture containing 170 mg. of this steroid and 2 ml. of 3:7 acetic anhydride:pyridine is allowed to stand at 90° C. for about three hours. The mixture is then concentrated to dryness under vacuum to afford 2β,3β-diacetoxy-5α,22-dihydroxy-6-ketocholane 24-carboxylic acid 22-lactone, which is recrystallized from methanol.

2β,3β - diacetoxy - 5α,22-dihydroxy-6-ketocholane 24-carboxylic acid 22-lactone is subjected to α-bromination, as described in Example 1. Thereafter, the 7-bromo compound is treated in accordance with the procedures described in the same example, thereby yielding 2β,3β-diacetoxy - 5α,14α,22-trihydroxy-6-ketochol-7-ene 24-carboxylic acid 22-lactone.

Example 5

A solution of 0.5 g. of 2β,3β-diacetoxy-5α-hydroxy-6-keto-22,23-bisnor-5α-chol-8(14)-enoic acid methyl ester in 25 ml. of chloroform containing a drop of pyridine is treated with 0.2 g. of m-chloroperbenzoic acid. The mixture is allowed to stand at room temperature for 20 minutes and then is washed with aqueous sodium sulfite and water. The organic solution is reduced to a small volume, dissolved in 10 ml. of dioxane and treated with 10 ml. of 1% aqueous sodium carbonate solution. This mixture is allowed to stand at room temperature for one hour and is then extracted with methylene chloride. These organic extracts are washed well with water, dried and evaporated to dryness to yield 2β,3β-diacetoxy-5α,14α-dihydroxy-6-keto-22,23-bisnor-5α-chol-7-enoic acid methyl ester, which may be recrystallized from methanol.

2β,3β - diacetoxy - 6 - keto-14α-hydroxy-22,23-bisnor-5α-chol-7-enoic acid methyl ester and 2β,3β-diacetoxy-6-keto - 14α - hydroxy - 22,23-bisnor-5β-chol-7-enoic acid methyl ester are obtained in a similar fashion from the corresponding $\Delta^{8(14)}$ compounds.

What is claimed is:

1. The process for the preparation of a 6-keto-14α-hydroxy-$\Delta^7$-dehydro steroid which comprises treatment of the corresponding 6-keto-$\Delta^{8(14)}$-dehydro steroid with a source of oxygen in the presence of light to form the corresponding 6-keto-14α-hydroperoxy-$\Delta^7$-dehydro steroid, and mild reduction of said 14α-hydroperoxy steroid to form the corresponding 6-keto-14α-hydroxy-$\Delta^7$-dehydro steroid.

2. The process according to claim 1 wherein said treatment of a 6-keto-$\Delta^{8(14)}$-dehydro steroid with a source of oxygen is in the presence of light of a wavelength from about 330 mμ to about 350 mμ.

3. The process according to claim 1 wherein said mild reduction is effected with zinc and acetic acid.

4. The process according to claim 1 wherein said mild reduction is effected with deactivated Raney nickel.

5. The process according to claim 1 wherein said treatment of a 6-keto-$\Delta^{8(14)}$-dehydro steroid with a source of oxygen is in the presence of light of a wavelength from about 330 mμ to about 350 mμ, and said mild reduction of the 6-keto-14α-hydroperoxy-$\Delta^7$-dehydro steroid is effected with zinc and acetic acid.

6. The process for the preparation of a 6-keto-14α-hydroxy-$\Delta^7$-dehydro steroid with comprices treatment of the corresponding 6-keto-$\Delta^{8(14)}$-dehydro steroid with an expoxidizing agent to form the corresponding 6-keto-8,14-oxido steroid and hydrolysis of said oxido steroid by treatment with acid or base to form the corresponding 6-keto-14α-hydroxy-$\Delta^7$-dehydro steroid.

7. The process of claim 6 wherein said epoxidizing agent is m-chloroperbenzoic acid and said hydrolysis is effected with dilute base.

No references cited.

HENRY A. FRENCH, *Primary Examiner.*

U.S. Cl. X.R.

204—158; 260—397.1, 397.2, 397.45